(12) United States Patent
Suh et al.

(10) Patent No.: US 11,950,003 B2
(45) Date of Patent: Apr. 2, 2024

(54) VISION SENSOR AND OPERATING METHOD OF THE SAME

(71) Applicant: Samsung Electronics Co., Ltd., Suwon-si (KR)

(72) Inventors: Yunjae Suh, Suwon-si (KR); Jongwoo Bong, Seoul (KR); Seungnam Choi, Seoul (KR); Junseok Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 126 days.

(21) Appl. No.: 17/828,331

(22) Filed: May 31, 2022

(65) Prior Publication Data
US 2022/0394195 A1 Dec. 8, 2022

(30) Foreign Application Priority Data

Jun. 4, 2021 (KR) .................. 10-2021-0073025

(51) Int. Cl.
*H04N 25/47* (2023.01)
*G06T 7/20* (2017.01)
*H04N 23/71* (2023.01)
*H04N 25/40* (2023.01)
*H04N 25/75* (2023.01)
*H04N 25/76* (2023.01)

(52) U.S. Cl.
CPC .............. *H04N 25/47* (2023.01); *G06T 7/20* (2013.01); *H04N 23/71* (2023.01); *H04N 25/40* (2023.01); *H04N 25/75* (2023.01); *H04N 25/76* (2023.01)

(58) Field of Classification Search
CPC ........ H04N 23/71; H04N 25/40; H04N 25/47; H04N 25/50; H04N 25/75; H04N 25/76; H04N 25/766; H04N 25/79; G06T 7/20
See application file for complete search history.

(56) References Cited

U.S. PATENT DOCUMENTS

| | | | |
|---|---|---|---|
| 7,728,269 B2 | 6/2010 | Lichtsteiner et al. | |
| 9,883,122 B2 | 1/2018 | Rangan et al. | |
| 10,133,334 B2 * | 11/2018 | Liu ...................... | G06F 3/005 |
| 10,445,924 B2 | 10/2019 | Shi et al. | |
| 10,567,679 B2 | 2/2020 | Berner et al. | |
| 10,855,927 B2 | 12/2020 | Jung et al. | |

(Continued)

FOREIGN PATENT DOCUMENTS

KR   10-2016-0112219 A   9/2016

*Primary Examiner* — Lin Ye
*Assistant Examiner* — Chriss S Yoder, III
(74) *Attorney, Agent, or Firm* — Harness, Dickey & Pierce, P.L.C.

(57) ABSTRACT

Provided are a vision sensor, an image processing device including the vision sensor, and an operating method of the vision sensor. The vision sensor includes a plurality of pixels arranged in a matrix form, wherein each of the plurality of pixels includes: a sensing circuit configured to output an output voltage by sensing a change of light; a comparison circuit configured to output a comparison signal indicating whether an event has occurred by comparing the output voltage to an event threshold; and an event detection circuit configured to generate internal event signals by sampling the comparison signal at each of a plurality of sampling time points, and configured to output a valid event signal based on the internal event signals.

20 Claims, 12 Drawing Sheets

(56) References Cited

U.S. PATENT DOCUMENTS

| | | |
|---|---|---|
| 10,904,462 B2 | 1/2021 | Berner |
| 2017/0094249 A1 | 3/2017 | Maitan et al. |
| 2020/0084403 A1 | 3/2020 | Suh et al. |
| 2020/0154064 A1 | 5/2020 | Berner et al. |
| 2020/0372254 A1 | 11/2020 | Laveau et al. |
| 2021/0014435 A1 | 1/2021 | Seo et al. |
| 2023/0199340 A1* | 6/2023 | Sakane ................ H04N 25/616 348/135 |

* cited by examiner

Multi-sampling

Characteristics Control

VISION SENSOR AND OPERATING METHOD OF THE SAME

CROSS-REFERENCE TO RELATED APPLICATION

This application is based on and claims priority under 35 U.S.C. § 119 to Korean Patent Application No. 10-2021-0073025, filed on Jun. 4, 2021 in the Korean Intellectual Property Office, the disclosure of which is incorporated by reference herein in its entirety.

BACKGROUND

The inventive concepts relate to a vision sensor and an operating method of the vision sensor, and more particularly, to a vision sensor outputting a valid event signal based on internal event signals, which are comparison signals sampled at multiple sampling time points in a pixel, an image processing device including the vision sensor, and an operating method of the vision sensor.

When an event (for example, an intensity change of light) occurs, a vision sensor, for example, a dynamic vision sensor may generate information about the event, that is, an event signal, and transfer the event signal to a processor.

On the other hand, an event may also occur by a valid signal indicating an intensity change of light, but an event may also occur by noise. Researches into a vision sensor for accurately sensing an event occurred by a valid signal, by determining whether an event has occurred by noise or a valid signal, are required.

SUMMARY

The inventive concepts provide a vision sensor generating internal event signals by sampling comparison signals at multiple sampling time points and by outputting a valid event signal based on the internal event signals, and an operating method of the vision sensor.

The technical object of the present example embodiments is not limited to the above-described technical objectives, and other technical objectives may be deduced from the following example embodiments.

According to an aspect of the inventive concepts, there is provided a vision sensor including a plurality of pixels arranged in a matrix form, wherein each of the plurality of pixels includes: a sensing circuit configured to output an output voltage by sensing a change of light; a comparison circuit configured to output a comparison signal indicating whether an event has occurred, by comparing the output voltage to an event threshold; and an event detection circuit configured to generate internal event signals by sampling the comparison signal at each of a plurality of sampling time points, and configured to output a valid event signal based on the internal event signals.

According to another aspect of the inventive concepts, there is provided a vision sensor including: a pixel array including a plurality of pixels arranged in a matrix form; and an event detection circuit configured to generate internal event signals by sampling a comparison signal indicating whether an event has occurred at each of a plurality of sampling time points from each of the plurality of pixels, and output a valid event signal based on the internal event signals, wherein the event detection circuit is configured to reset a pixel corresponding to the output valid event signal.

According to another aspect of the inventive concepts, there is provided an operating method of a vision sensor, the operating method including: generating a comparison signal indicating whether an event has occurred, from each of a plurality of pixels; generating internal event signals by sampling the comparison signal at each of a plurality of sampling time points; determining whether a valid event has occurred in each of the plurality of pixels, based on the internal event signals; when it is determined that the valid event has occurred, generating a valid event signal corresponding to a pixel, where the valid event has occurred; and when the valid event signal is generated, resetting the pixel, where the valid event has occurred.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, example embodiments of the inventive concepts will be described in detail with reference to the accompanying drawings so that those of ordinary skill in the art can easily implement the inventive concepts. However, the inventive concepts may be implemented in various different forms and is not limited to the example embodiments described herein.

Hereinafter, example embodiments of the inventive concepts will be described in detail with reference to the drawings.

Figure 1:
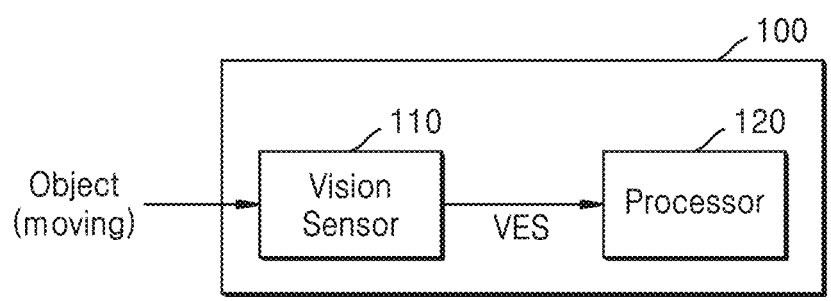
FIG. 1 is a block diagram of an image processing device according to example embodiments.

FIG. 1 is a block diagram of an image processing device 100 according to example embodiments.

The image processing device 100 according to example embodiments may be mounted on an electronic equipment having an image or light sensing function. For example, the image processing device 100 may be mounted on an electronic equipment such as a camera, a smartphone, wearable equipment, Internet of Things (IoT) equipment, a personal computer (PC), a personal digital assistant (PDA), a portable multimedia player (PMP), a navigation device, a drone, and an advanced drivers assistance system (ADAS). In addition, the image processing device 100 may be provided as a component of vehicles, furniture, manufacturing equipment, doors, various measuring equipment, etc.

Referring to FIG. 1, the image processing device 100 may include a vision sensor 110 and/or a processor 120. The vision sensor 110 may sense an intensity change of an incident light, and transmit a valid event signal VES to the processor 120. The valid event signal VES may mean an event signal generated in response to a pixel, where a valid event has occurred based on a valid signal.

The vision sensor 110 may sense an intensity change of an incident light, and output an event signal. The vision sensor 110 may include a dynamic vision sensor outputting the valid event signals VES with respect to pixels, where an intensity change of light is sensed, that is, an event occurs. An intensity change of light may be caused by a movement of an object photographed by the vision sensor 110, or by a movement of the vision sensor 110 itself or the image processing device 100 itself. The vision sensor 110 may periodically or aperiodically transmit the valid event signals VES to the processor 120. The vision sensor 110 may transmit the valid event signals VES in units of packets or frames to the processor 120.

The vision sensor 110 may transmit selectively the valid event signals VES to the processor 120. The vision sensor 110 may transmit to the processor 120 the valid event signals VES generated in the pixels PX corresponding to a region of interest set on a pixel array, among the event signals generated in response to the pixel array.

In example embodiments, the vision sensor 110 may receive comparison signals indicating whether an event has occurred at each of a plurality of pixels at each of a plurality of sampling time points, and may output the valid event signal VES of each of the plurality of pixels based on the comparison signals sampled at each of plurality of different sampling time points from each other. When an event occurs at each of the plurality of sampling time points, the vision sensor 110 may output the valid event signal VES and transmit the valid event signal VES to the processor 120. In addition, when outputting the valid event signal VES, the vision sensor 110 may reset a pixel where a valid event has occurred.

The processor 120 may process the valid event signals VES received from the vision sensor 110, and may detect a movement of an object (or, a movement of an object in an image recognized by the image processing device 100). The processor 120 may include application-specific integrated circuit (ASIC), field programmable gate array (FPGA), a dedicated microprocessor, a microprocessor, a general purpose processor, etc. In example embodiments, the processor 120 may include an application processor or an image processing processor.

On the other hand, each of the vision sensor 110 and the processor 120 may be implemented as an integrated circuit (IC). For example, the vision sensor 110 and the processor 120 may be implemented as discrete chips. Alternatively, the vision sensor 110 and the processor 120 may be implemented as a single chip. For example, the vision sensor 110 and the processor 120 may be implemented as a system on chip (SoC).

Figure 2:
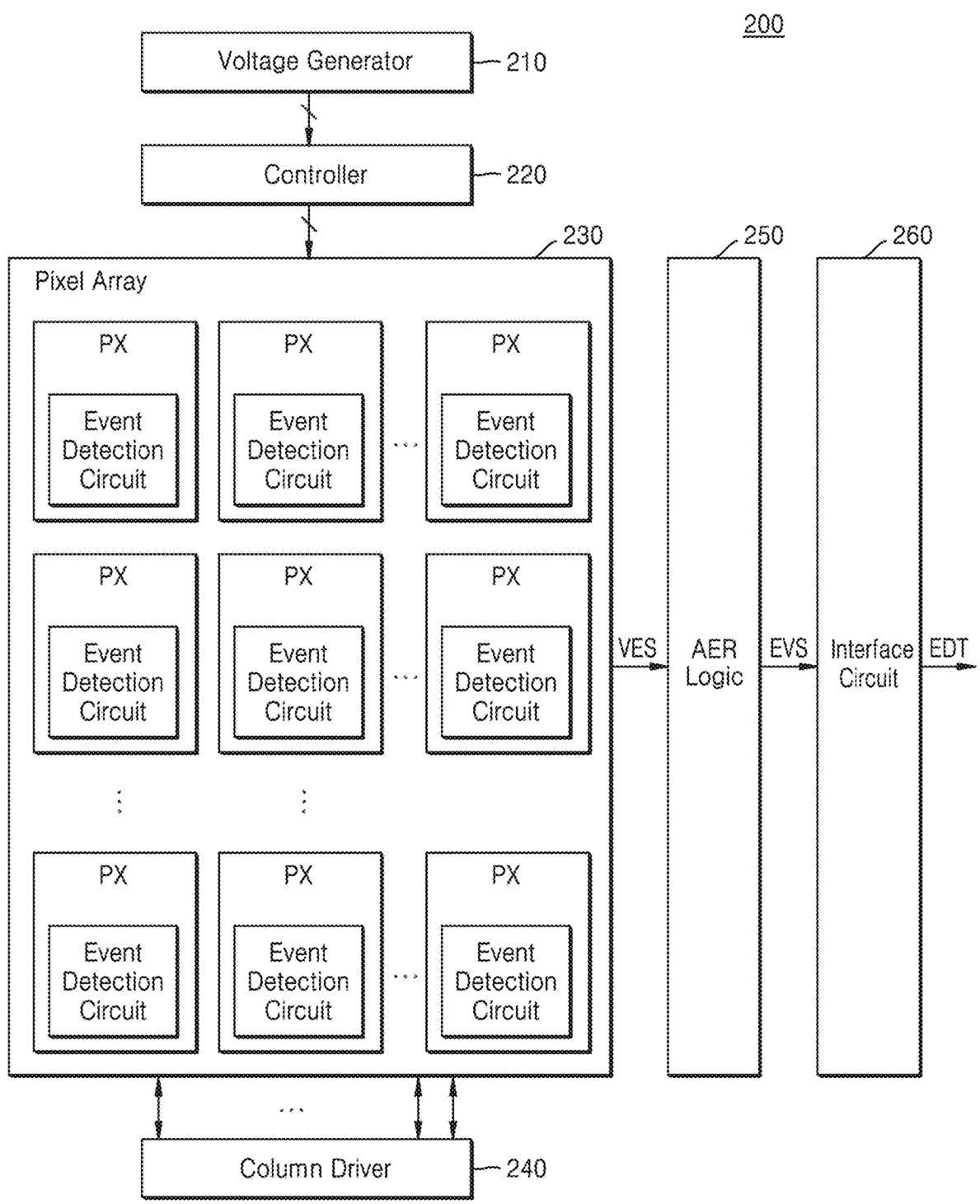
FIG. 2 is a diagram of configuration of a vision sensor according to example embodiments.

FIG. 2 is a diagram of configuration of a vision sensor 200 according to example embodiments.

Referring to FIG. 2, the vision sensor 200 may include a voltage generator 210, a controller 220, a pixel array 230, a column driver 240, an address event representation (AER) logic 250, and/or an interface circuit 260. Because the vision sensor 200 of FIG. 2 corresponds to the vision sensor 110 of FIG. 1, duplicate descriptions thereof are omitted.

The voltage generator 210 may generate a voltage provided to the pixel array 230. The voltage generator 210 may be used to detect an on-event and an off-event transmitted by a pixel PX, and may generate bias voltages biasing components of the pixel PX. The voltage generator 210 may change voltage levels of the bias voltages provided to the pixels PX of the pixel array 230. When the voltage level of the bias voltage is changed, an event threshold for detecting an on-event and an off-event in the pixel PX may be changed.

The controller 220 may control the bias voltages output by the voltage generator 210. The controller 220 may select at least one of output bias voltages and provide it to a particular pixel, and to a particular component of a particular pixel. For example, the controller 220 may provide a first bias voltage to an amplifier of a first pixel, and a second bias voltage to an amplifier of a second pixel. As another example, the controller 220 may provide the first bias voltage to the amplifier of the first pixel, and the second bias voltage to the amplifier of the second pixel.

The controller 220 may provide event thresholds to the pixels PX by controlling bias voltages. The controller 220 may provide a bias voltage so that an event threshold compared to the comparison signal sampled at each of the plurality of sampling time points. For example, the controller 220 may provide a bias voltage to the pixel PX so that an event threshold compared to a comparison signal sampled at a first sampling time point is greater than an event threshold compared to a comparison signal sampled at a second sampling time point.

Although the controller 220 is illustrated outside the pixel array 230, it is not necessarily limited thereto, and the controller 220 may also be included inside the pixel array 230, and may also be included inside the pixel PX. For example, when the controller 220 is included inside the pixel PX, the controller 220 may select at least one of the bias voltages output by the voltage generator 210 and provide the at least one of the bias voltages to the components of the pixel PX. Example embodiments in which the controller 220 is included inside the pixel PX will be described below with reference to FIG. 4.

The pixel array 230 may include a plurality of pixels PX arranged in a matrix form. Each of the plurality of pixels PX may sense events, in which an intensity of received light increases or decreases.

In example embodiments, each of the plurality of pixels PX may include an event detection circuit outputting the valid event signal VES. A comparison signal indicating whether an event has occurred and polarity information about an event (that is, whether the event is an on-event with increasing intensity of light or an off-event with decreasing intensity of light) may be output to the event detection circuit in one pixel PX.

The event detection circuit may determine whether a valid event has occurred in the pixel PX including the event detection circuit. The event detection circuit may read an event from the pixel PX, and output the valid event signal VES. The event detection circuit may determine whether a valid event has occurred based on a signal indicating whether an event has occurred in a pixel PX including the event detection circuit, and may output the valid event signal VES. The valid event signal VES may include polarity information about an occurred event, information about time of occurrence of a valid event, etc. The valid event may not mean an event occurred by noise but an occurrence of an event according to an intensity change of light due to a valid signal.

The event detection circuit may perform sampling of a signal indicating whether an event has occurred at each of the plurality of sampling time points, and output the valid event signal VES based on the sampled signal. When events occur at all of the plurality of sampling time points, the event detection circuit may output the valid event signal VES. For example, when events occur at both two particular sampling time points, the event detection circuit may output the valid event signal VES. The event detection circuit may perform an AND operation on signals sampled at the plurality of sampling time points, and output the valid event signal VES.

When the valid event signal VES is output, the event detection circuit may reset the pixel PX having output the valid event signal VES. For example, the event detection circuit of the first pixel outputting the valid event signal VES may reset the first pixel, and the event detection circuit of the second pixel not outputting the valid event signal VES may not reset the second pixel. The event detection circuit may control a period of resetting the pixel PX.

When the pixel PX is reset at a time of an event occurrence by noise, because in subsequent operations, a determination reference point of a change in a brightness of the pixel PX (hereinafter, intensity brightness reference point) is set based on the valid signal and previously generated noise, accuracy of an intensity change detection operation may be reduced. However, the vision sensor 200 according to the inventive concepts may reset the pixel PX only when outputting the valid event signal VES, and because the brightness reference point of the pixel PX is set based on the valid signal, accuracy of the intensity change detection operation may be increased.

The column driver 240 may select pixels included on each row of the pixel array 230. The valid event signal VES of the pixel selected by the column driver 240 may be output outside the pixel array 230. The column driver 240 may sequentially select a plurality of rows included in a matrix structure of the pixel array 230 according to a preset period. In FIG. 2, only the column driver 240 is illustrated, but the vision sensor 200 may also include a row driver selecting pixels included on each column of the pixel array 230.

The vision sensor 200 may include an AER logic 250. The AER logic 250 may generate an address of a pixel where an event has occurred based on the valid event signal VES output by the event detection circuit, and may output an event signal EVS. The AER logic 250 may output an event signal EVS including information about a valid event occurrence time of the pixel PX, in which an event has occurred, a column address, a row address or an address including a group address, and polarity information. The AER logic 250 may output the event signal EVS to the interface circuit 260. The event signal EVS may be generated in various types of formats, and may be generated in, for example, an AER format including address information of a pixel, where the valid event has occurred, information about a time, at which the valid event has occurred, and polarity information, or may be generated in a raw format including event occurrence information with respect to all pixels.

For example, the AER logic 250 may receive the valid event signal VES output by the pixel PX, where an event has occurred, and may generate a column address of the pixel PX, where an event has occurred. The AER logic 250 may receive the valid event signal VES output by the pixel PX, where an event has occurred, and may generate a row address of the pixel PX, where an event has occurred. The AER logic 250 may also generate group addresses in units of preset groups.

In example embodiments, the pixel array 230 may be scanned in units of columns, and when a particular column, for example, the valid event signal VES is received from pixels of a first column, the AER logic 250 may transmit a response signal to a first column. The pixel PX, where an event of receiving a response signal occurs, may transmit polarity information (for example, a signal indicating an on-event or an off-event occurrence) to the AER logic 250. As another example, the pixel array 230 may be scanned in units of rows, and when the valid event signal VES is received from pixels of a particular row, the AER logic 250 may transmit a response signal to the particular row, and the pixel PX, where an event of receiving a response signal has occurred, may transmit polarity information to the AER logic 250. In addition, the AER logic 250 may also access individually pixels PX, where an event has occurred.

The interface circuit 260 may receive the event signals EVS, and according to a set protocol, may transmit the event signal EVS to a processor (for example, the processor 120 in FIG. 1). The interface circuit 260 may generate an event data EDT by packing the event signals EVS in units of individual signals, packets, or frames according to a set protocol, and transmit the event data EDT to a processor. For example, the interface circuit 260 may include one of an AER interface, a mobile industry processor interface (MIPI) interface, and a parallel interface.

Hereinafter, in the inventive concepts, an expression that the valid event signal VES is output may mean that the valid event signal VES is converted into the event signal EVS by using the AER logic 250, the event signal EVS is converted into the event data EDT by using the interface circuit 260, and the event data EDT is transmitted to a processor.

Figure 3:
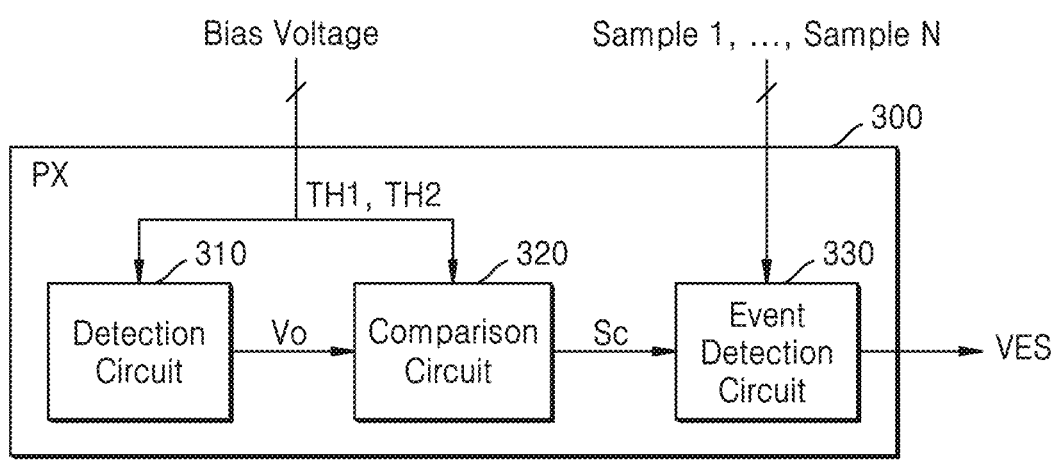
FIG. 3 is a diagram of a pixel according to example embodiments.

FIG. 3 is a diagram of a pixel 300 according to example embodiments.

Referring to FIG. 3, the pixel 300 may include a detection circuit 310, a comparison circuit 320, and/or an event detection circuit 330. The pixel 300 and the event detection circuit 330 in FIG. 3 may correspond to the pixel PX and the event detection circuit in FIG. 2, respectively, and thus, duplicate descriptions thereof are omitted.

The detection circuit 310 may sense a change of light and output an output voltage Vo. The detection circuit 310 may sense a change of light and output an output voltage Vo. The output voltage Vo may be changed according to a level of a change of light. For example, as the level of the intensity change of light increases, a magnitude of the output voltage Vo may increase. However, example embodiments are not limited thereto. The detection circuit 310 may output the output voltage Vo to the comparison circuit 320.

The comparison circuit 320 may compare the output voltage Vo to the event threshold, and output a comparison signal Sc indicating whether an event occurs. The comparison signal Sc may include at least one of an on-signal E_ON and an off-signal E_OFF. For example, when the output voltage Vo is greater than an on event threshold, the comparison circuit 320 may output the on-signal E_ON, and when the output voltage Vo is less than off event threshold, the comparison circuit 320 may output the on-signal E_OFF. The comparison circuit 320 may provide the comparison signal Sc to the event detection circuit 330.

The event detection circuit 330 may receive the comparison signal Sc, and sample the comparison signal Sc at each of the plurality of sampling time points. The event detection circuit 330 may sample the comparison signal Sc at each of the plurality of sampling time points, and generate internal event signals. The internal event signal may mean the comparison signal Sc sampled at each of the plurality of sampling time points. For example, when the comparison signal Sc sampled at a first sampling time point is an on-signal, the event detection circuit 330 may generate the internal event signal.

The event detection circuit 330 may determine whether a valid event has occurred based on the internal event signal. When events have occurred at each of the plurality of sampling time points, the event detection circuit 330 may determine that the valid event has occurred, and output the valid event signal VES. For example, when an on-signal has been sampled at each of the plurality of sampling time points and the internal event signal has been generated, the event detection circuit 330 may output the valid event signal VES. As another example, when an off-signal has been sampled at each of the plurality of sampling time points and the internal event signal has been generated, the event detection circuit 330 may output the valid event signal VES.

The event detection circuit 330 may sample the comparison signal Sc at each of the plurality of sampling time points corresponding to each of a plurality of sampling signals in response to each of first through $N^{th}$ sampling signals Sample1 through SampleN. The first through $N^{th}$ sampling signals Sample1 through SampleN may be applied to the pixel 300 from the outside of the pixel 300. The first through $N^{th}$ sampling signals Sample1 through SampleN may also be output by a controller (for example, the controller 220 in FIG. 2), and may also be output by a timing logic included in a vision sensor. The first through $N^{th}$ sampling signals Sample1 through SampleN may be received with time intervals. For example, the event detection circuit 330 may sample the comparison signal Sc at the first sampling time point corresponding to the first sampling signal Sample1 and at the second sampling time point corresponding to the second sampling signal Sample2 and generate the internal event signal, and output the valid event signal VES based on the internal event signal.

In example embodiments, the first through $N^{th}$ sampling signals Sample1 through SampleN may be provided to the event detection circuit 330 via an identical connection line. For example, the first sampling signal Sample1 and the second sampling signal Sample2 received after the first sampling signal Sample1 may be provided to the event detection circuit 330 via the identical connection line. Because the first through $N^{th}$ sampling signals Sample1 through SampleN are sequentially provided via the identical connection line, a distribution connection between the pixel PX of a vision sensor and external configuration of the pixel PX (the controller 220 or a timing logic in FIG. 2) may be simple.

In other example embodiments, each of the first through $N^{th}$ sampling signals Sample1 through SampleN may be provided to the event detection circuit 330 via different connection lines from each other. For example, the first sampling signal Sample1 may be provided to the event detection circuit 330 via a first line, and the second sampling signal Sample2 received after the first sampling signal Sample1 may be provided to the event detection circuit 330 via a second line. Because each of the first through $N^{th}$ sampling signals Sample1 through SampleN is provided via different connection lines from each other, internal configuration of the event detection circuit 330 may be simple.

When the valid event signal VES is output, the event detection circuit 330 may reset the pixel 300. For example, when the valid event signal VES is output, the event detection circuit 330 may provide a reset signal to the detection circuit 310.

Bias voltages may be applied to the pixel 300 from the outside of the pixel 300. The bias voltages may be applied by a controller (for example, the controller 220 in FIG. 2). A controller may provide bias voltages each corresponding to the detection circuit 310 and the comparison circuit 320, among bias voltages output by a voltage generator (for example, the voltage generator 210 in FIG. 2), to the detection circuit 310 and the comparison circuit 320, respectively.

Based on the bias voltages provided to the comparison circuit 320, an on-event threshold TH1 and an off-event threshold TH2 may be changed. The on- and off-event thresholds TH1 and TH2, which are sampled at each of the plurality of sampling time points, may be different from each other. In example embodiments, the on- and off-event thresholds TH1 and TH2 provided to the comparison circuit 320 may be different from each other at a plurality of sampling time points. For example, a magnitude of the off-event threshold TH2 compared to the comparison signal Sc sampled at the second sampling time point may be less than a magnitude of the on-event threshold TH1 compared to the comparison signal Sc sampled at the first sampling time point. Alternatively, in example embodiments, the on- and off-event thresholds TH1 and TH2 provided to the comparison circuit 320 may also be the same as each other at the plurality of sampling time points.

Figure 4:
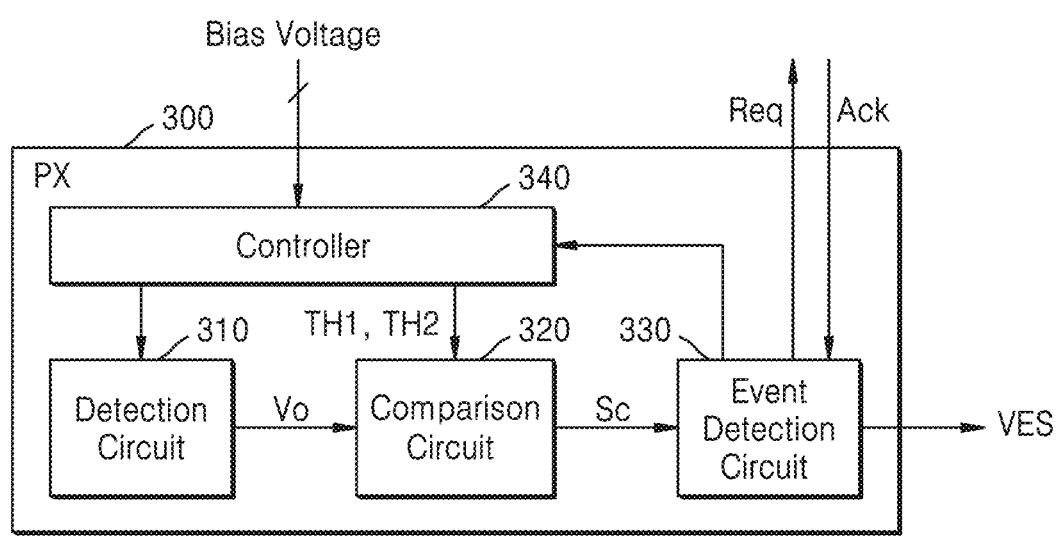
FIG. 4 is a diagram of a pixel according to other example embodiments.

FIG. 4 is a diagram of the pixel 300 according to other example embodiments. FIG. 4 may further include a controller 340 in the pixel 300 in FIG. 3.

Referring to FIG. 4, the controller 340 may be included inside the pixel 300. The controller 340 may select at least one of the bias voltages output by a voltage generator (for example, the voltage generator 210 in FIG. 2), and provide the selected at least one to at least one of components of the pixel PX.

The controller 340 may provide the bias voltages corresponding to the detection circuit 310 and the comparison circuit 320 to the detection circuit 310 and the comparison circuit 320, respectively. For example, the controller 340 may receive the bias voltages, provide the first bias voltage of the bias voltages to the detection circuit 310, and provide the second bias voltage to the second bias voltage.

Referring to FIG. 4, the event detection circuit 330 may, instead of having a sampling signal applied thereto, sample the comparison signal Sc at each of the plurality of sampling time points set inside the pixel 300, and output the valid event signal VES. The event detection circuit 330 may also communicate with a controller (for example, the controller 220 in FIG. 2) in a hand shaking method, and may also communicate with a timing logic included in a vision sensor in a hand shaking method. For example, the event detection circuit 330 may, when it is determined that a valid event has occurred, output a request signal Req to the timing logic. The timing logic may output an acknowledgement signal Ack corresponding to each of the plurality of sampling time points in response to the request signal Req. The event detection circuit 330 may output the valid event signal VES based on the acknowledgement signal Ack.

The event detection circuit 330 may be connected to the controller 340. The event detection circuit 330 may provide information about the plurality of sampling time points set inside the pixel 300 to the controller 340. The controller 340 may provide bias voltages different from each other at each of the plurality of sampling time points. The controller 340 may provide bias voltages different at each of the plurality of sampling time points to the comparison circuit 320, and the on- and off-event thresholds TH1 and TH2 provided to the comparison circuit 320 may be changed. For example, a magnitude of the off-event threshold TH2 compared to the comparison signal Sc sampled at the second sampling time point set inside the pixel 300 may be less than a magnitude of the on-event threshold TH1 compared to the comparison signal Sc sampled at the first sampling time point set inside the pixel 300.

Figure 5:
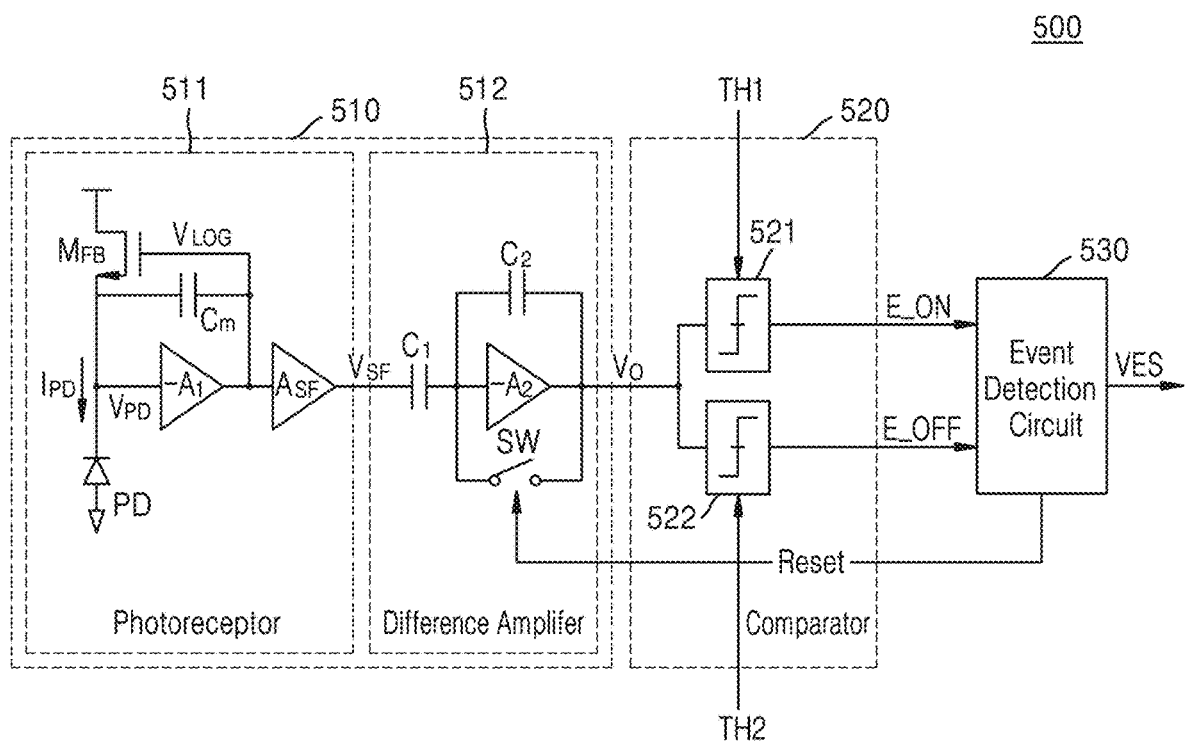
FIG. 5 is a diagram of components of a pixel.

FIG. 5 is a diagram of components of a pixel 500.

Referring to FIG. 5, the pixel 500 may include a sensing circuit 510, a comparison circuit 520, and/or an event detection circuit 530. The pixel 500, the sensing circuit 510, the comparison circuit 520, and the event detection circuit 530 in FIG. 5 may correspond to the pixel 300, the detection circuit 310, the comparison circuit 320, and the event detection circuit 330 in FIGS. 3 and 4, respectively, and thus, duplicate descriptions thereof are omitted.

The sensing circuit 510 may include a photoreceptor 511 and/or a difference amplifier 512.

The photoreceptor 511 may include a photoelectric conversion element PD, a capacitor Cm, an amplifier $A_1$, an amplifier $A_{SF}$, and/or a transistor $M_{FB}$. The photoelectric conversion element PD may sense an incident light, that is, a light signal, and convert the incident light into an electrical signal, for example, current $I_{PD}$. The photoelectric conversion element PD may include, for example, a photodiode, a phototransistor, a photogate, or a pinned photodiode, etc. The photoelectric conversion element PD may generate an electrical signal having a higher level as an intensity of an incident light increases. The current $I_{PD}$ may flow through the transistor $M_{FB}$ in response to the intensity of light sensed by the photoelectric conversion element PD, and a voltage VLOG output to the amplifier $A_{SF}$ may be generated.

The amplifier $A_1$ may amplify the output $V_{PD}$ of the photoelectric conversion element PD so that the magnitude of the voltage VLOG is linearly proportional to the intensity of light sensed by the photoelectric conversion element PD. The amplifier $A_{SF}$ may amplify the output $V_{PD}$ of the amplifier $A_1$ and the voltage VLOG to generate a voltage $V_{SF}$. The photoreceptor 511 may further include a capacitor for removing noise generated inside or introduced from the outside of the pixel 500, and various switches. For example, the capacitor Cm may remove noise introduced from the outside of the pixel 500.

The difference amplifier 512 may be connected to the photoreceptor 511, and may amplify the voltage $V_{SF}$ output by the photoreceptor 511, and output the output voltage Vo. The difference amplifier 512 may include a capacitor $C_1$, a capacitor $C_2$, an amplifier $A_2$, and/or a switching element SW. The capacitor $C_1$ may be connected to the amplifier $A_{SF}$ in series. The capacitor $C_1$ may charge an electric charge as the voltage $V_{SF}$ generated by the photoreceptor 511 is changed. The amplifier $A_2$ may amplify a voltage generated by the charge charged in the capacitor $C_1$ at a predetermined or alternatively, desired ratio. An amplification rate of the amplifier $A_2$ may be determined as a ratio of capacitance of the capacitor $C_1$ to capacitance of the capacitor $C_2$. The capacitor $C_2$ may include a feedback capacitor. The switching element SW may reset the charge charged in the capacitor $C_1$ in response to the reset signal of the event detection circuit 530. The switching element SW may include, for example, a transistor, but is not necessarily limited thereto. The difference amplifier 512 may receive the voltage $V_{SF}$ output by the photoreceptor 511, and amplify a voltage change amount of the voltage $V_{SF}$ The output voltage Vo of the difference amplifier 512 may be provided to the first comparator 521 and the second comparator 522.

The comparison circuit 520 may include the first comparator 521 and/or the second comparator 522. The first comparator 521 and the second comparator 522 may generate comparison signals by comparing the output voltage Vo to the on- and off-event thresholds TH1 and TH2, respectively. For example, the first comparator 521 may compare the output voltage Vo of the difference amplifier 512 to the on-event threshold TH1, and generate the on-signal E_ON according to the comparison result. As another example, the second comparator 522 may compare the output voltage Vo of the difference amplifier 512 to the off-event threshold TH2, and generate the off-signal E_OFF according to the comparison result.

The first comparator 521 and the second comparator 522 may generate the on-signal E_ON or the off-signal E_OFF, when a change amount of light received by the photoelectric conversion element PD is equal to or greater than a certain change level. For example, the on-signal E_ON may have a high level when the amount of light received by the photoelectric conversion element PD increases to a certain level or more, and the off-signal E_OFF may have a high level when the amount of light received by the photoelectric conversion element PD decreases to a certain level or less.

On the other hand, when photosensitivity is adjusted, levels of the on-event threshold TH1 and the off-event threshold TH2 may be changed. For example, the photosensitivity may be reduced. Accordingly, the level of the on-event threshold TH1 may be increased and the level of the off-event threshold TH2 may be reduced. Accordingly, the first comparator 521 and the second comparator 522 may generate the on-signal E_ON or the off-signal E_OFF, when the change amount of light received by the photoelectric conversion element PD is greater than the previous level (that is, before the levels of the on-event threshold TH1 and the off-event threshold TH2 are changed).

The event detection circuit 530 may sample at least one of the on-signal E_ON and the off-signal E_OFF at each of the plurality of sampling time points to generate an internal event signal IES, and may output a valid event signal VES based on the internal event signal.

The event detection circuit 530 may hold discretely the on-signal E_ON and the off-signal E_OFF, and then, output discretely the on-signal E_ON and the off-signal E_OFF. For example, the event detection circuit 530 may, after holding, perform an on-signal E_ON sampling and an off-signal E_OFF sampling at each of the plurality of sampling time points.

Figure 6:
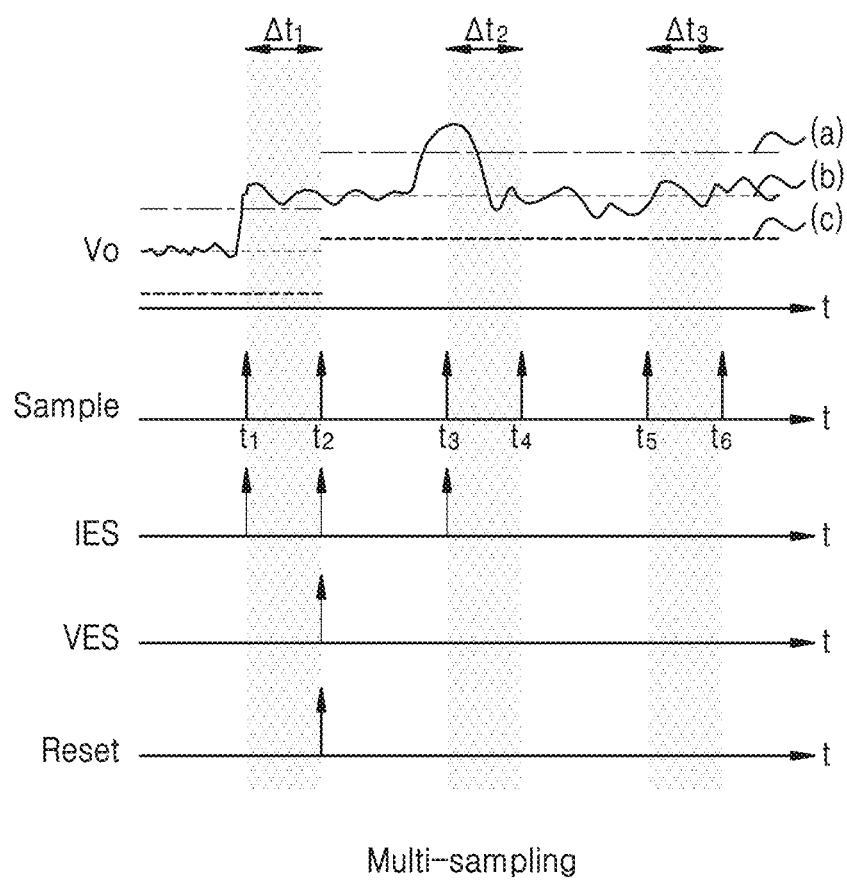
FIG. 6 is a graph illustrating detection of a valid event signal, according to example embodiments.

FIG. 6 is a graph illustrating detection of a valid event signal, according to example embodiments.

Referring to FIG. 6, the horizontal axis of the graph may mean the time, the vertical axis thereof may mean the output voltage Vo, the sampling time point Sample, an internal event signal IES, the valid event signal VES, and a reset signal Reset for resetting a pixel.

There are time differences such as a time interval $\Delta t_1$ between a first sampling time point $t_1$ and a second sampling time point $t_2$, a time interval $\Delta t_2$ between a third sampling time point $t_3$ and a fourth sampling time point $t_4$, and a time interval $\Delta t_3$ between a fifth sampling time point $t_5$ and a sixth sampling time point $t_6$. The time intervals $\Delta t_1$, $\Delta t_2$, and $\Delta t_3$ of each of the plurality of sampling time points may mean a time taken for noise to decrease again and return to a normal level after an event due to noise occurs.

The time intervals $\Delta t_1$, $\Delta t_2$, and $\Delta t_3$ of each of the plurality of sampling time points may be set based on at least one of illuminance of light incident on each of the plurality of pixels and the amount of an event. The time interval of each of the plurality of sampling time points may be inversely proportional to the illuminance of light incident on the pixel. For example, when the illuminance of light incident on the pixel is about 10 1x, the time interval of each of the plurality of sampling time points may be about 100ᵘs, when the illuminance of light incident on the pixel is about 100 1x, the time interval of each of the plurality of sampling time points may be about 10 s, and when the illuminance of light incident on the pixel is about 1000 1x, the time interval of each of the plurality of sampling time points may be about 1 μs, but example embodiments are not limited thereto. Each of the time intervals $\Delta t_1$, $\Delta t_2$, and $\Delta t_3$ of each of the plurality of sampling time points may also be identical to each other, or may also be different from each other.

The time intervals $\Delta t_1$, $\Delta t_2$, and $\Delta t_3$ of each of the plurality of sampling time points may be controlled in units of pixels. The time intervals $\Delta t_1$, $\Delta t_2$, and $\Delta t_3$ of each of the plurality of sampling time points of each pixel may be different from each other. For example, the time interval $\Delta t_1$ of the first pixel may be about 1ᵘs, and the time interval $\Delta t_1$ of the second pixel may be about $\Delta t_1$ 10ᵘs, which are different from each other. In addition, the time intervals $\Delta t_1$, $\Delta t_2$, and $\Delta t_3$ of each of the plurality of sampling time points may be controlled in units of patches. The time intervals $\Delta t_1$, $\Delta t_2$, and $\Delta t_3$ of each of the plurality of sampling time points of pixels included in a patch may be the same as each other. For example, the time interval $\Delta t_1$ of the first pixel and the time interval $\Delta t_1$ of the second pixel included in the same patch may be the same as about 1ᵘs.

In example embodiments, the event detection circuit may generate the internal event signal IES by sampling the comparison signal Sc at two sampling time points, and based thereon, may output the valid event signal VES. When the event detection circuit generates the internal event signal IES by receiving the comparison signal Sc at the first sampling time point $t_1$, generates the internal event signal IES at the second sampling time point $t_2$ after a first time from the first sampling time point $t_1$, and generates the internal event signal IES at the first sampling time point $t_1$ and the second sampling time point $t_2$, the valid event signal VES may be output. In other words, when an event occurs at the first sampling time point $t_1$ and the second sampling time point $t_2$, the event detection circuit may output the valid event signal VES. The first sampling time point $t_1$ may mean an early sampling time point among two sampling time points, and the second sampling time point $t_2$ may mean a sampling time point later than the first sampling time point $t_1$ by the first time or the time interval $\Delta t_1$.

Referring to FIG. 6, because the output voltage Vo is greater than an on-event threshold (a), the event detection circuit may generate the internal event signal IES by sampling the on-signal, and because the output voltage Vo is greater than the on-event threshold (a) at the second sampling time point $t_2$, the event detection circuit may generate the internal event signal IES by sampling the on-signal. Because the internal event signal IES is generated at both the first sampling time point $t_1$ and the second sampling time point $t_2$, the event detection circuit may determine that a valid event has occurred, and output the valid event signal VES.

Because a pixel is reset at the second sampling time point $t_2$, at which a valid event has occurred, brightness reference point (b) of the pixel may be changed at the second sampling time point $t_2$ as a reference. Because the valid event signal VES is output, the event detection circuit may reset the pixel. A sampling time point, at which a pixel is reset, may also be the same as a sampling time point, at which the valid event signal VES is output, and may also be a time point after the valid event signal VES is output.

Because the output voltage Vo is greater than the on-event threshold (a) at the third sampling time point $t_3$, the event detection circuit may generate the internal event signal IES by receiving the on-signal, and because the output voltage Vo is less than the on-event threshold (a) and greater than an off-event threshold (c) at the fourth sampling time point $t_4$, the event detection circuit may not generate the internal event signal IES. Because the internal event signal IES has been generated at the third sampling time point $t_3$, but the internal event signal IES has been generated at the fourth sampling time point $t_4$, the event detection circuit may determine that a valid event has not occurred and may not output the valid event signal VES. Because the valid event signal VES is not output, the event detection circuit may not reset the pixel.

The event detection circuit may generate the internal event signal IES by sampling the comparison signal Sc at three sampling time points, and based thereon, may output the valid event signal VES. When the event detection circuit generates the internal event signal IES by receiving the comparison signal Sc at the first sampling time point $t_1$, generates the internal event signal IES by receiving the comparison signal Sc at the second sampling time point $t_2$ after the first time from the first sampling time point $t_1$, generates the internal event signal IES by receiving the comparison signal Sc at an additional sampling time point after a second time from the second sampling time point $t_2$, and an event occurs at the first sampling time point $t_1$, the second sampling time point $t_2$, and the additional sampling time point, the valid event signal VES may be output. The first sampling time point $t_1$ may mean an earliest sampling time point among three sampling time points, the second sampling time point $t_2$ may mean a sampling time point after the first time or the time interval $\Delta t_1$ from the first sampling time point $t_1$, and the additional sampling time point may mean a sampling time point after a particular time interval from the second sampling time point $t_2$. The time interval between the first sampling time point $t_1$ and the second sampling time point $t_2$ may be the same as or different from the time interval between the second sampling time point $t_2$ and the additional sampling time point.

Figure 7:
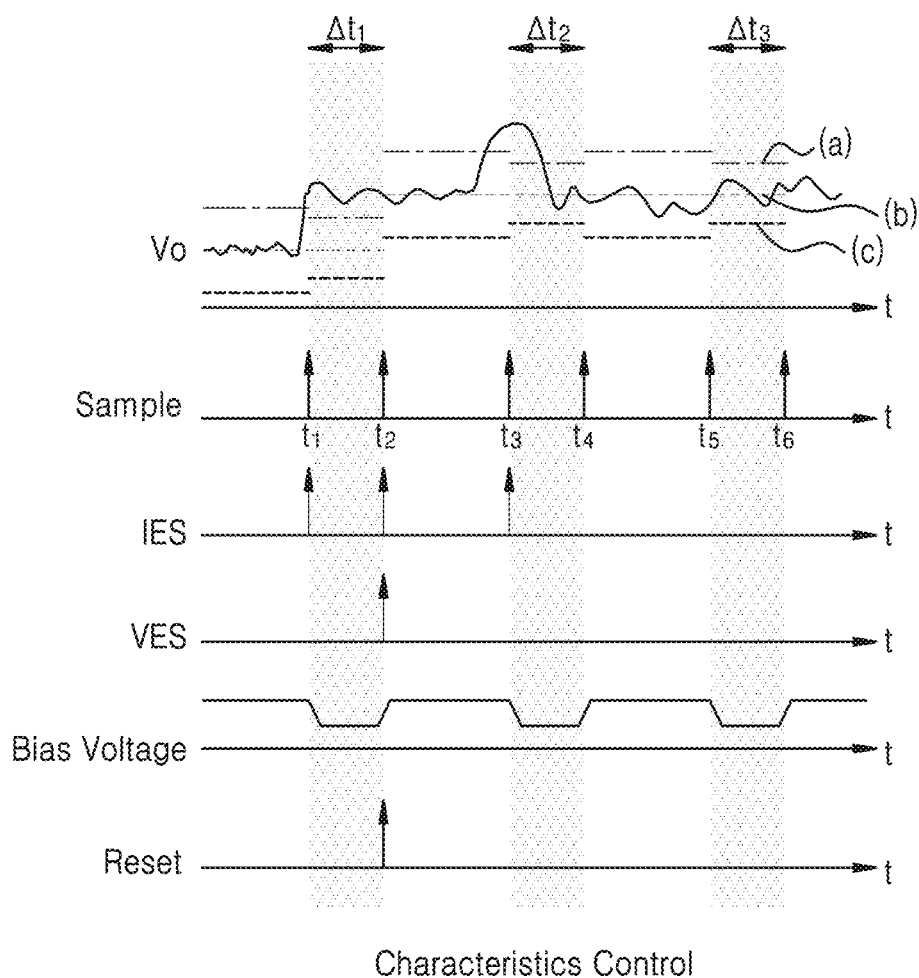
FIG. 7 is a diagram of controlling an event threshold.

FIG. 7 is a diagram of controlling an event threshold. Contents of FIG. 7 are extensions of those of FIG. 6, and thus, duplicate descriptions thereof are omitted.

Referring to FIG. 7, the bias voltages may be different at each of the plurality of sampling time points. A controller (for example, the controller 220 in FIG. 2) may provide the bias voltage so that an event threshold compared to a comparison signal sampled at each of the plurality of sampling time points is changed. The event threshold may be changed based on the bias voltages provided to a pixel. The event thresholds corresponding to the comparison signals sampled at each of the plurality of sampling time points may be different from each other. The event threshold corresponding to the comparison signal sampled at each of the plurality of sampling time points may mean an event threshold compared to the comparison signal sampled at each of the plurality of sampling time points.

The event threshold may include the on-event threshold (a) and the off event threshold (c). For example, the on-event threshold (a) compared to the comparison signal sampled at the first sampling time point $t_1$ may be greater than the on-event threshold (a) compared to the comparison signal sampled at the second sampling time point $t_2$. A difference between the brightness reference point (b) of a pixel at the first sampling time point $t_1$ and the on-event threshold (a) compared to the comparison signal sampled at the first sampling time point $t_1$ may be greater than a difference between the brightness reference point (b) of the pixel at the second sampling time point $t_2$ and the on-event threshold (a) compared to the comparison signal sampled at the second sampling time point $t_2$.

By setting different the event thresholds corresponding to the comparison signals sampled at each of the plurality of sampling time points, an event occurrence due to noise may be reduced or prevented, and an event occurrence due to the valid signal may be effectively filtered.

Figure 8:
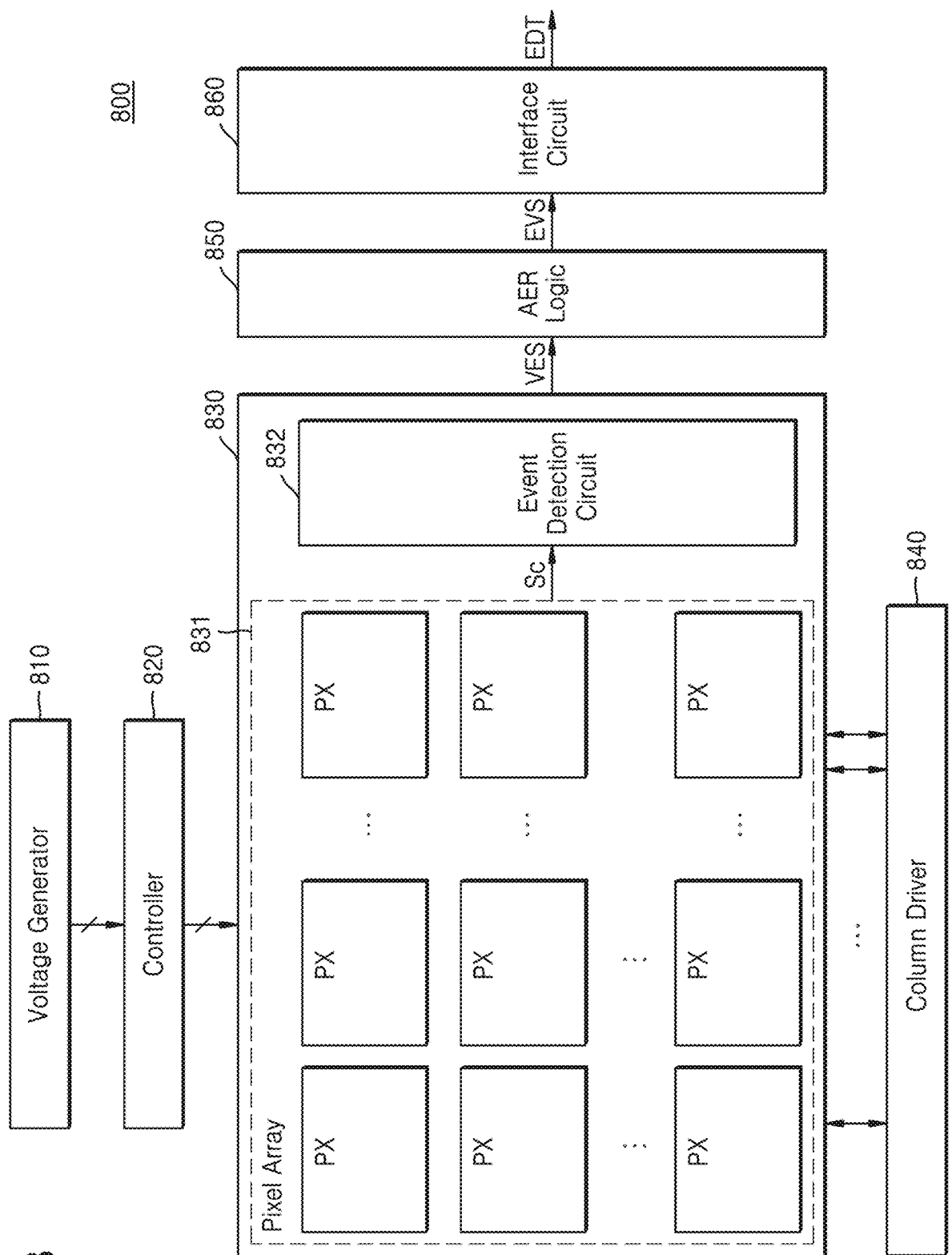
FIG. 8 is a diagram of configuration of a vision sensor according to other example embodiments.

FIG. 8 is a diagram of configuration of a vision sensor 800 according to other example embodiments.

Referring to FIG. 8, the vision sensor 800 may include a voltage generator 810, a controller 820, a pixel array chip 830, a column driver 840, an AER logic 850, and/or an interface circuit 860, and the pixel array chip 830 may include a pixel array 831 and/or an event detection circuit 832. The vision sensor 800, the voltage generator 810, the controller 820, the column driver 840, the AER logic 850, the interface circuit 860, the pixel array 831, and/or the event detection circuit 832 in FIG. 8 may correspond to the vision sensor 200, the voltage generator 210, the controller 220, the column driver 240, the AER logic 250, the interface circuit 260, the pixel array 230, and/or the event detection circuit in FIG. 2, respectively, and thus, duplicate descriptions thereof are omitted.

In example embodiments, the pixel array 831 and the event detection circuit 832 may be included in the same chip. The pixel array 831 and the event detection circuit 832 may be included in the pixel array chip 830. The event detection circuit 832 may be outside the pixel array 831, but the pixel array 831 and the event detection circuit 832 may be implemented as one chip.

The event detection circuit 832 may sample the comparison signal Sc indicating whether an event has occurred at each of the plurality of sampling time points, from each of a plurality of pixels PX, and based on the sampled comparison signal Sc, may output the valid event signal VES of each of the plurality of pixels PX. For example, each of the plurality of pixels PX may be connected to the event detection circuit 832 via a column line extending in a column direction and a row line extending in the row direction. The event detection circuit 832 may generate an internal event signal by sampling the comparison signal Sc of each of the plurality of pixels PX, and may output a valid event signal VES of each of the plurality of pixels PX based on the internal event signal.

The event detection circuit 832 may output the valid event signal VES when an event occurs at each of the plurality of sampling time points. In other words, when the internal event signal is generated at each of the plurality of sampling time points, the event detection circuit 832 may output the valid event signal VES. For example, when the event detection circuit 832 generates the internal event signal by sampling the comparison signal Sc at a first sampling time point, generates the internal event signal by sampling the comparison signal Sc at a second sampling time point after the first time from the first sampling time point, and generates the internal event signals at the first sampling time point and the second sampling time point, the valid event signal VES may be output.

The event detection circuit 832 may, when outputting the valid event signal VES, reset a pixel corresponding to the output valid event signal VES. The pixel corresponding to the output valid event signal VES may mean a pixel, in which a valid event has occurred. When outputting the valid event signal VES, the event detection circuit 832 may provide the reset signal Reset for resetting the pixel PX outputting the valid event signal VES to the pixel array 831.

The event detection circuit 832 may process the events occurred in the pixel array 831 in units of pixels, pixel groups including the plurality of pixels, columns, or frames.

Figure 9:
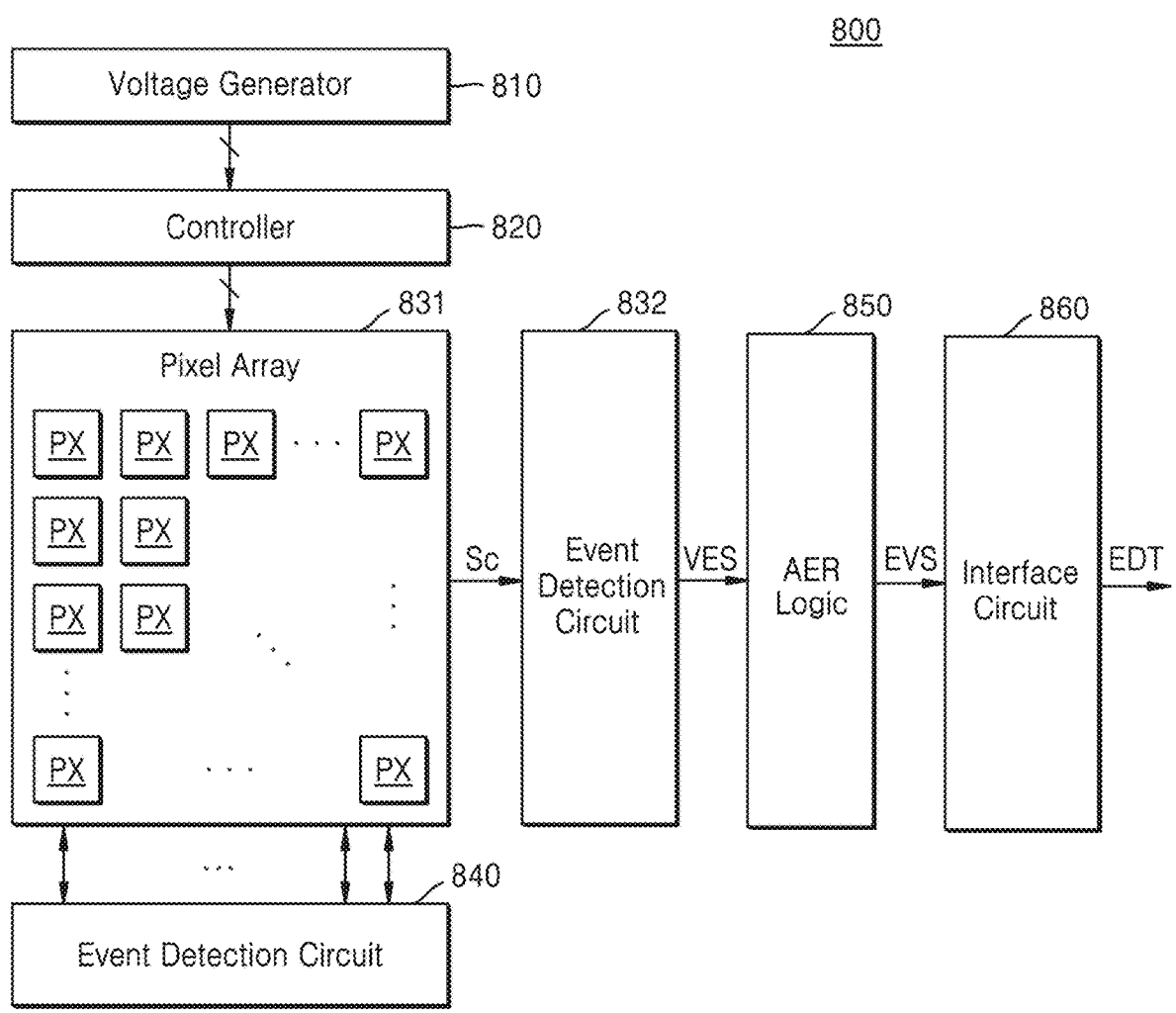
FIG. 9 is a diagram of configuration of a vision sensor according to other example embodiments.

FIG. 9 is a diagram of configuration of the vision sensor 800 according to other example embodiments. FIG. 9 illustrates that the pixel array 831 and the event detection circuit 832 in FIG. 8 are implemented as different chips.

Referring to FIG. 9, the vision sensor 800 may include the voltage generator 810, the controller 820, the pixel array 831, the event detection circuit 832, the column driver 840, the AER logic 850, and/or the interface circuit 860.

In example embodiments, the pixel array 831 and the event detection circuit 832 may be included in different chips from each other. The event detection circuit 832 may be implemented separately from the pixel array 831.

The event detection circuit 832 may sample the comparison signal Sc, indicating whether an event has occurred at each of the plurality of sampling time points, from each of the plurality of pixels PX to generate the internal event signal, and based on the internal event signal, may output the valid event signal VES of each of the plurality of pixels PX. Each of the plurality of pixels PX may be connected to the event detection circuit 832 via the column line extending in the column direction and the row line extending in the row direction.

The event detection circuit 832 may output the valid event signal VES when an event occurs at each of the plurality of sampling time points. When the internal event signal is generated at each of the plurality of sampling time points, the event detection circuit 832 may determine that the valid event has occurred. When the valid event signal VES is output, the event detection circuit may reset the pixel PX having output the valid event signal VES.

The vision sensor 800 may include the AER logic 850. The AER logic 850 may generate an address of a pixel where an event has occurred based on the valid event signal VES output by the event detection circuit, and may output an event signal EVS. Although FIG. 9 illustrates that the event detection circuit 832 and the AER logic 850 are implemented as separate configurations, example embodiments are not necessarily limited thereto, and the AER logic 850 may be included in the event detection circuit 832. For example, the event detection circuit 832 may sample the comparison signal Sc from each of the plurality of pixels PX to determine the pixel PX, in which the valid event has occurred, and generate the event signal EVS based on the valid event signal VES.

Figure 10:
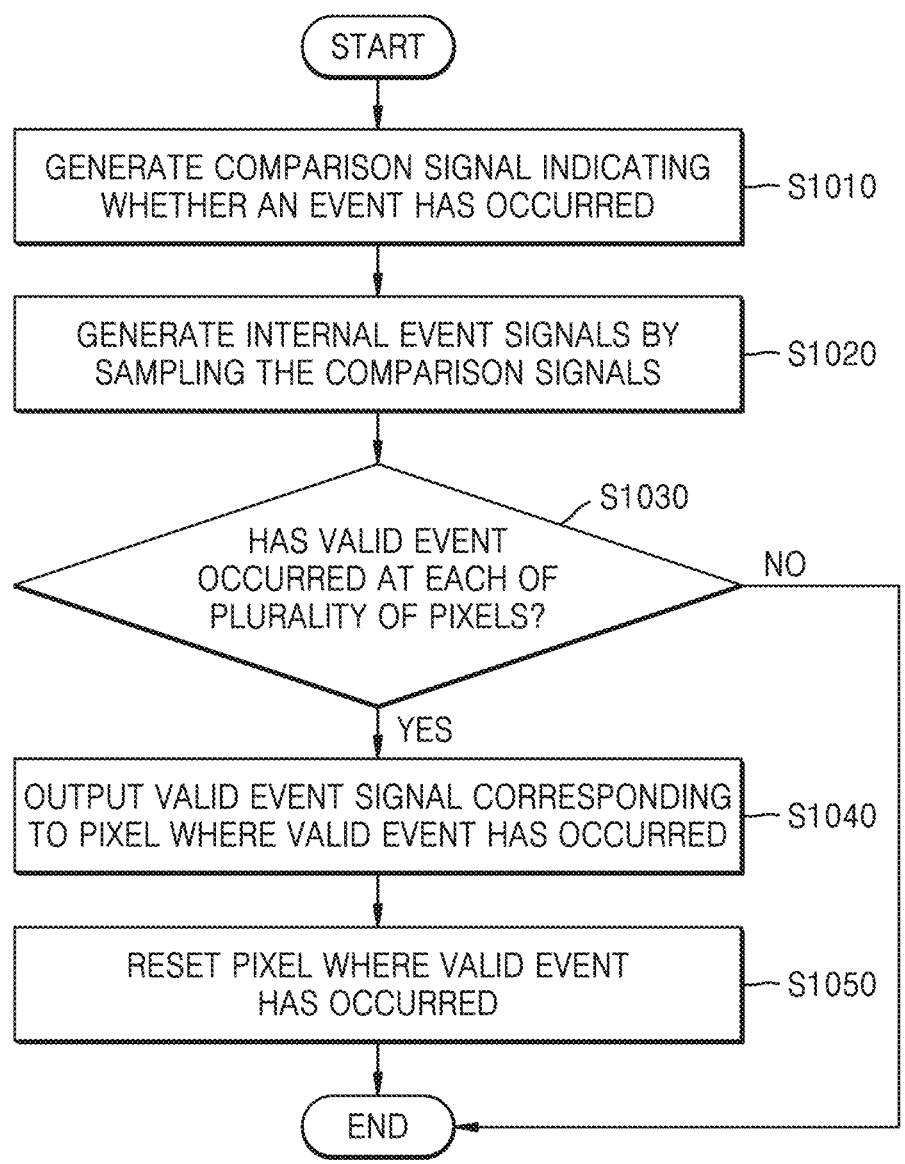
FIG. 10 is a flowchart of an operating method of a vision sensor, according to example embodiments.

FIG. 10 is a flowchart of an operating method of a vision sensor, according to example embodiments.

The operating method of FIG. 10 may be performed in a vision sensor described with reference to FIGS. 1 through 9. The operation method of FIG. 10 may be performed in the event detection circuit.

The vision sensor may generate a comparison signal indicating whether an event has occurred at each of a plurality of sampling time points from each of a plurality of pixels (S1010), and may generate internal event signals by sampling the comparison signals at each of the plurality of sampling time points (S1020). The vision sensor may sample the comparison signals at two sampling time points. For example, the vision sensor may generate the internal event signal by sampling the comparison signal at a first sampling time point, and may generate the internal event signal by sampling the comparison signal at a second sampling time point after the first time from the first sampling time point. The comparison signal may mean a signal indicating whether an event occurs by comparing an output voltage output by detecting an intensity change of light by the detection circuit to an event threshold. The comparison signal may include at least one of an on-signal and an off-signal.

The vision sensor may provide bias voltages to pixels. The event thresholds corresponding to the comparison signals sampled at each of the plurality of sampling time points may be different from each other. The event threshold corresponding to the comparison signal sampled at each of the plurality of sampling time points may mean an event threshold compared to the comparison signal sampled at each of the plurality of sampling time points. For example, the on-event threshold a compared to the comparison signal sampled at the first sampling time point may be greater than the on-event threshold compared to the comparison signal sampled at the second sampling time point.

The vision sensor may determine whether a valid event has occurred in each of the plurality of pixels based on internal event signals, which are sampled comparison signals (S1030). When a valid event has occurred in each of the plurality of pixels, operation S1040 may be performed, and when a valid event has not occurred in each of the plurality of pixels, the operating method of the vision sensor may be terminated.

When an event has occurred at each of the plurality of sampling time points, the vision sensor may determine that a valid event has occurred. For example, when the internal event signal is generated at both the first sampling time point and the second sampling time point, the vision sensor may determine that a valid event has occurred.

When it is determined that a valid event has occurred, the vision sensor may generate a valid event signal corresponding to the pixel, in which the valid event has occurred (S1040). When events have occurred at all of the plurality of sampling time points, the vision sensor may output the valid event signal. For example, when the internal event signal is generated at both the first sampling time point and the second sampling time point, the vision sensor may generate the valid event signal.

When the valid event signal is generated, the vision sensor may reset a pixel, in which a valid event has occurred (S1050). When the valid event signal is generated, the vision sensor may provide a reset signal for resetting a pixel, in which a valid event has occurred, to a corresponding pixel. In example embodiments, operation S1050 may also be performed simultaneously with operation S1040, or after operation S1040.

Figure 11:
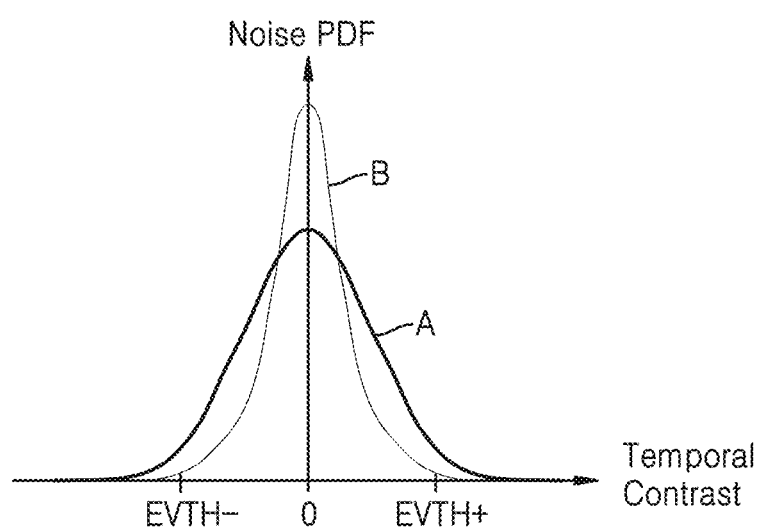
FIG. 11 is an experiment result by using a vision sensor according to example embodiments.

FIG. 11 is an experiment result by using a vision sensor according to example embodiments.

Referring to FIG. 11, the horizontal axis of the graph of FIG. 11 may mean an amplitude of noise, and the vertical axis thereof may mean a noise probability distribution. A graph A illustrates the noise probability distribution when a conventional vision sensor is used. A graph B illustrates the noise probability distribution when a vision sensor according to the present disclosure is used.

In example embodiments of a valid signal without noise, the noise probability distribution may be about 0. When the event occurrence due to noise is more accurately filtered, the noise probability distribution may be closer to about 0, and a width of a noise probability distribution graph may be narrower. Because a width of the graph B is less than a width of the graph A, it may be identified that when the vision sensor according to the inventive concepts is used, the noise probability distribution is improved.

Figure 12:
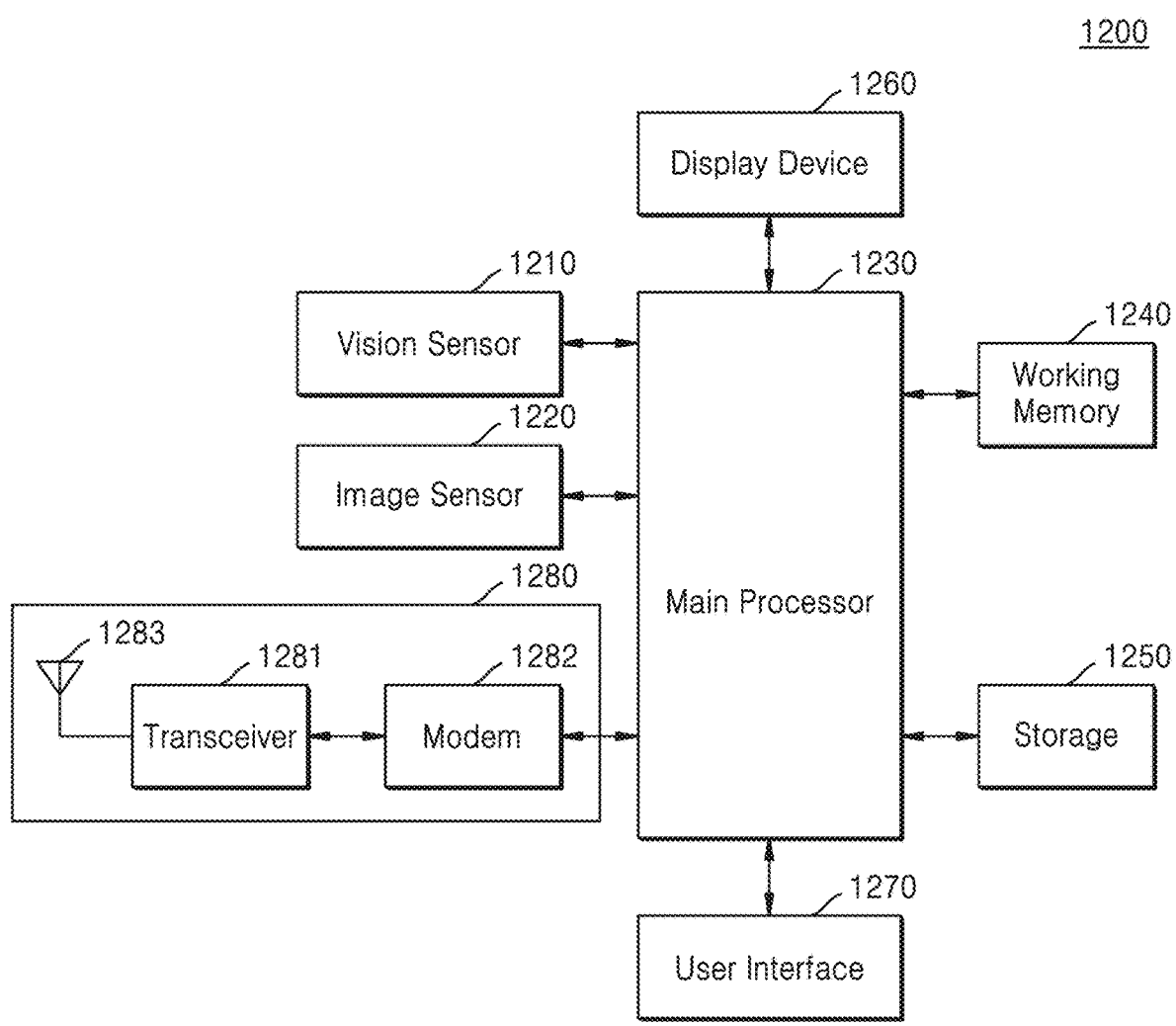
FIG. 12 is an example block diagram of an electronic equipment to which a vision sensor is applied, according to example embodiments.

FIG. 12 is an example block diagram of an electronic equipment 1200, to which a vision sensor is applied, according to example embodiments.

Referring to FIG. 12, the electronic equipment 1200 may include a vision sensor 1210, a main processor 1230, a working memory 1240, a storage 1250, a display device 1260, a communication unit 1280, and/or a user interface 1270.

The vision sensor described with reference to FIGS. 1 through 11 may be applied as the vision sensor 1210 in FIG. 12. The vision sensor 1210 may sense an object to generate valid event signals, and transmit the generated valid event signals to the main processor 1230. The vision sensor 1210 may receive a signal indicating whether an event has occurred at each of the plurality of sampling time points, generate the valid event signal based on the received signal, and transmit the valid event signal to the main processor 1230. The vision sensor 1210 may output the valid event signal when receiving a signal indicating whether an event has occurred at each of the plurality of sampling time points. Accordingly, the event occurrence due to noise and the event occurrence due to a valid signal may be clearly distinguished, and a noise level may be reduced.

In addition, when the valid event signal is generated, the vision sensor 1210 may reset the pixel, which has output the valid event signal. Because a pixel is reset when a noise-removed valid event signal is output and the valid signal is output, the brightness reference point of the pixel may be set based on the valid signal, and thus, an event occurrence due to noise may be reduced.

The main processor 1230 may control the overall operation of the electronic equipment 1200, and may detect a movement of an object by processing event data, that is, event signals, received from the vision sensor 1210.

The working memory 1240 may store data to be used for an operation of the electronic equipment 1200. For example, the working memory 1240 may temporarily store packets or frames processed by the main processor 1230. For example, the working memory 1240 may include a volatile memory such as dynamic random access memory (RAM) (DRAM) and synchronous DRAM (SDRAM), and/or a non-volatile memory such as phase-change RAM (PRAM), magneto-resistive RAM (MRAM), relative RAM (ReRAM), and ferro-electric RAM (FRAM).

The storage 1250 may store data requested to be stored by the main processor 1230 or other components. The storage 1250 may include a non-volatile memory such as flash memory, PRAM, MRAM, ReRAM, and FRAM.

The display device 1260 may include a display panel, a display driving circuit, and a display serial interface (DSI). For example, the display panel may be implemented as various devices such as a liquid crystal display (LCD) device, a light emitting diode (LED) display device, an organic LED (OLED) display device, and an active matrix OLED (AMOLED) display device. The display driving circuit may include a timing controller, a source driver, or the like, required to drive the display panel. A DSI host embedded in the main processor 1230 may perform serial communication with the display panel via the DSI.

The communication unit 1280 may exchange signals with an external device/system via an antenna 1283. A transceiver 1281 and a modulator/demodulator (modem) 1282 of the communication unit 1280 may process signals exchanged with the external device/system, according to a wireless communication protocol such as long term evolution (LTE), worldwide interoperability for microwave access (WIMAX), global system for mobile communication (GSM), code division multiple access (CDMA), Bluetooth, near field communication (NFC), wireless fidelity (Wi-Fi), and radio frequency identification (RFID).

The user interface 1270 may include at least one of input interfaces such as a keyboard, a mouse, a keypad, a button, a touch panel, a touch screen, a touch pad, a touch ball, a gyroscope sensor, a vibration sensor, and an acceleration sensor.

In example embodiments, each of elements described above may be and/or include, for example, processing circuitry such as hardware, software, or the combination of hardware and software. For example, the processing circuitry more specifically may include (and/or be included in), but is not limited to, a processor (and/or processors), Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), graphics processing unit (GPU), etc.

Components of the electronic equipment 1200, for example, the vision sensor 1210, the main processor 1230, the working memory 1240, the storage 1250, the display device 1260, the communication unit 1280, and/or the user interface 1270 may exchange data based on one or more of various interface protocols such as universal serial bus (USB), small computer system interface (SCSI), mobile industry processor interface (MIPI), inter-integrated circuit (I2C), peripheral component interconnect express (PCIe), mobile PCIe (M-PCIe), advanced technology attachment (ATA), parallel ATA (PATA), serial ATA (SATA), integrated drive electronics (IDE), non-volatile memory express (NVMe), and universal flash storage (UFS).

While the inventive concepts have been particularly shown and described with reference to example embodiments thereof, it will be understood that various changes in form and details may be made therein without departing from the spirit and scope of the following claims.

What is claimed is:

1. A vision sensor comprising a plurality of pixels arranged in a matrix form, wherein each of the plurality of pixels comprises:
   a sensing circuit configured to output an output voltage by sensing a change of light;
   a comparison circuit configured to output a comparison signal indicating whether an event has occurred, by comparing the output voltage to an event threshold; and
   an event detection circuit configured to generate internal event signals by sampling the comparison signal at each of a plurality of sampling time points, and configured to output a valid event signal based on the internal event signals.

2. The vision sensor of claim 1, wherein, when all of the internal event signals have been generated at each of the plurality of sampling time points, the event detection circuit is configured to output the valid event signal.

3. The vision sensor of claim 1, wherein, when outputting the valid event signal, the event detection circuit is configured to reset the pixel.

4. The vision sensor of claim 1, wherein a time interval of each of the plurality of sampling time points is set based on at least one of illuminance of light incident on each of the plurality of pixels and an event amount.

5. The vision sensor of claim 1, wherein the event detection circuit is configured to sample the comparison signal at a first sampling time point, is configured to sample the comparison signal at a second sampling time point after a first time from the first sampling time point, and, when the internal event signals have been generated at the first sampling time point and the second sampling time point, is configured to output the valid event signal.

6. The vision sensor of claim 1, wherein the event thresholds corresponding to comparison signals sampled at each of the plurality of sampling time points are different from each other.

7. The vision sensor of claim 1, wherein the event detection circuit is configured to sample the comparison signal in response to each of the plurality of sampling signals received at each of the plurality of sampling time points.

8. The vision sensor of claim 7, wherein the plurality of sampling signals are provided to the event detection circuit via an identical connection line.

9. The vision sensor of claim 7, wherein each of the plurality of sampling signals are provided to the event detection circuit via different connection lines from each other.

10. A vision sensor comprising:
    a pixel array comprising a plurality of pixels arranged in a matrix form; and
    an event detection circuit configured to generate internal event signals by sampling a comparison signal indicating whether an event has occurred at each of a plurality of sampling time points from each of the plurality of pixels, and output a valid event signal based on the internal event signals,
    wherein the event detection circuit is configured to reset a pixel corresponding to the output valid event signal.

11. The vision sensor of claim 10, wherein, when the internal event signals have been generated at each of the plurality of sampling time points, the event detection circuit is configured to output the valid event signal.

12. The vision sensor of claim 10, wherein the event detection circuit is configured to sample the comparison signal at a first sampling time point, is configured to sample the comparison signal at a second sampling time point after a first time from the first sampling time point, and, when the internal event signals have been generated at the first sampling time point and the second sampling time point, is configured to output the valid event signal.

13. The vision sensor of claim 10, wherein event thresholds corresponding to comparison signals sampled at each of the plurality of sampling time points are different from each other.

14. The vision sensor of claim 10, wherein the pixel array and the event detection circuit are comprised in an identical chip.

15. The vision sensor of claim 10, wherein the pixel array and the event detection circuit are comprised in different chips from each other.

16. An operating method of a vision sensor, the operating method comprising:
    generating a comparison signal indicating whether an event has occurred, from each of a plurality of pixels;
    generating internal event signals by sampling the comparison signal at each of a plurality of sampling time points;
    determining whether a valid event has occurred in each of the plurality of pixels, based on the internal event signals;
    when it is determined that the valid event has occurred, generating a valid event signal corresponding to a pixel, where the valid event has occurred; and when the valid event signal is generated, resetting the pixel, where the valid event has occurred.

17. The operating method of claim 16, wherein the determining of whether the valid event has occurred, comprises, when the internal event signals have been generated at each of the plurality of sampling time points, determining that the valid event has occurred.

18. The operating method of claim 16, wherein the generating of the internal event signals comprises sampling the comparison signal at a first sampling time point, and sampling the comparison signal at a second sampling time point after a first time from the first sampling time point.

19. The operating method of claim 18, wherein the determining of whether the valid event has occurred, comprises, when the internal event signals have been generated at the first sampling time point and the second sampling time point, determining that the valid event has occurred.

20. The operating method of claim 16, wherein event thresholds corresponding to comparison signals sampled at each of the plurality of sampling time points are different from each other.

\* \* \* \* \*